Feb. 25, 1936. G. A. BOETTCHER 2,032,198
THREAD RESTORING TOOL
Filed Nov. 21, 1933
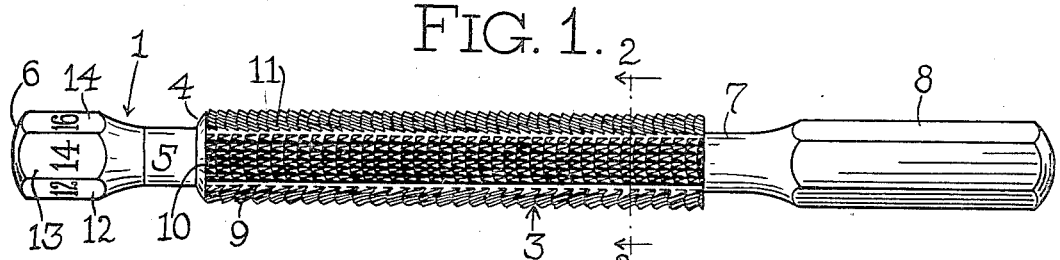
FIG. 1.
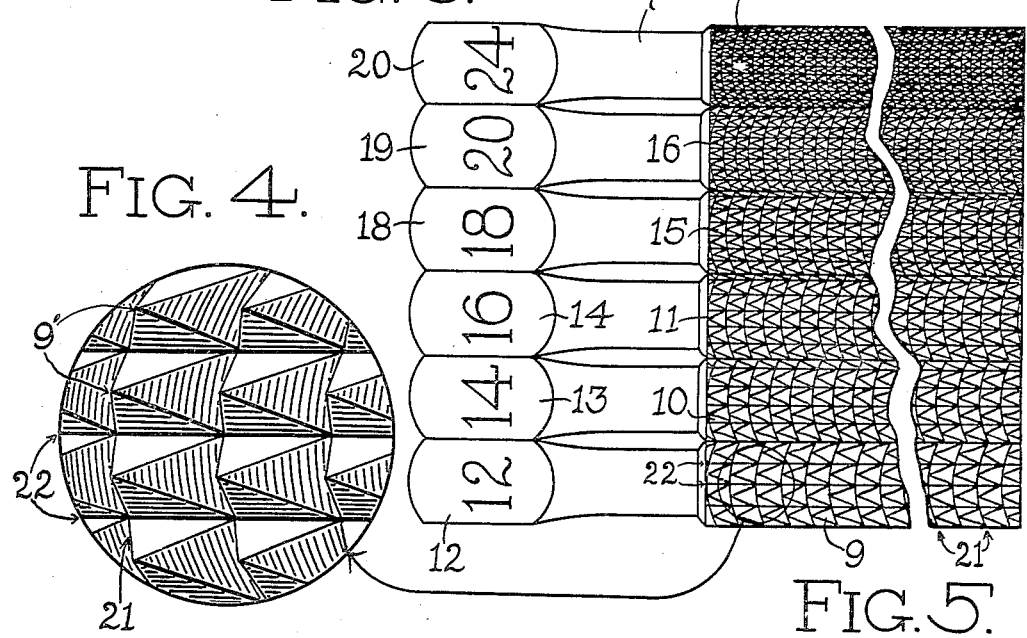
FIG. 3.
FIG. 4.
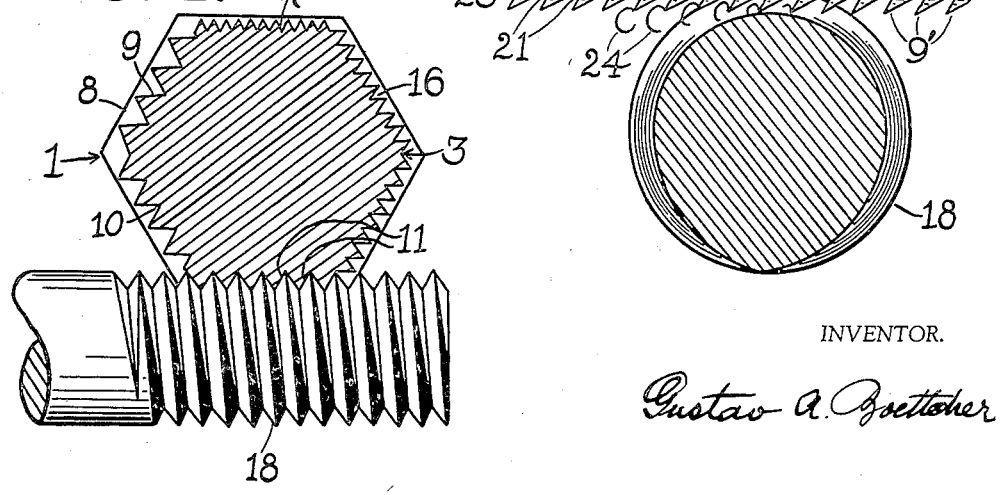
FIG. 2.
FIG. 5.
INVENTOR.
Gustav A. Boettcher Patented Feb. 25, 1936

2,032,198

UNITED STATES PATENT OFFICE 2,032,198

THREAD RESTORING TOOL

Gustav A. Boettcher, Richmond Hill, N. Y.

Application November 21, 1933, Serial No. 699,065

1 Claim. (Cl. 10—1)

This invention relates to thread restoring tools of the type having a plurality of cutting faces of novel form and of different thread pitch which are disposed intermediate two hand holds and adapted to recondition damaged or old threads upon round objects such as shafts, bolts, screws and the like.

The main object of my invention is to provide a tool of the character indicated which has cutting faces consisting of groups of teeth of novel form and arrangement, the face of each cutting tooth being undercut and convexly curved, while the teeth are arranged in curved rows.

Another object of my invention is to provide such a tool with an integral handle at each end of the tool, so that it may be gripped before and behind the cutting faces, ensuring a good grip and control of the pressure applied to the cutting operation, and also eliminating any injury to the hands by the cutting faces.

A further object is to provide a clearance before and behind the cutting faces in the form of narrowed portions of the tool terminating in the hand holds which are rendered easy to grip by reason of said narrowed portions, the hand holds at one end also conveniently having flat faces provided with the proper indication of the thread adapted to be restored by the cutting faces in line therewith.

Other objects and the various advantages accruing from the constructional form and arrangement of the features of my invention will appear more fully in detail as this specification proceeds.

In the accompanying drawing forming part hereof,

Fig. 1 is a view of a thread restoring tool made according to my invention and embodying the advantageous features thereof in a practical form.

Fig. 2 is a cross sectional view of the tool when in use, the section being taken on line 2—2 in Fig. 1.

Fig. 3 is a plan view of the cutting faces of the tool, as well as the faces of the hand hold of one end of the tool with the indicia identifying the cutting faces individually.

Fig. 4 is an enlarged view of a fragment of one of the cutting faces of Fig. 3 to reveal more detail.

Fig. 5 is a profile view of a fragment of one of the cutting faces of the tool in position on a work piece and enlarged to show the form of shavings produced by the teeth of the tool.

Throughout the views, the same reference numerals indicate the same or like parts.

In the practice of my invention, I prefer to use steel stock of regular geometric cross section, such as for example, hexagonal form, or any other, as desired. Herein, the tool is shown as of hexagonal form and is generally indicated at 1. An intermediate portion of the tool indicated generally at 3 is provided upon all its circumferential faces with areas or cutting faces of acute teeth, as at 9, 10, 11, 15, 16 and 17, each cutting face having teeth so proportioned and arranged as to be capable of cutting threads of a different pitch than those of any other face. The first requisite for such cutting is that the cutting teeth as at 9, for example, shall be arranged in straight lines disposed practically longitudinally of the tool, but preferably at a slight inclination toward one side to correspond with the actual pitch and angle of the thread which said teeth are intended to match.

The teeth of cutting face 11 are shown as cutting along the threads of a threaded object 18 in Fig. 2 to indicate the manner in which the tool is used to renew damaged threads. The tool has a handle 8 connected to the intermediate section 3 by a reduced portion or neck 7, by which to grip the tool and push it across the thread to be conditioned again, while at the other end, a relatively shorter handle is provided at 6, also connected to the intermediate portion 3 by a neck or reduced section 5. These reduced sections 5 and 7 serve two purposes, the first being to cause the handles at the ends to be more freely gripped because they are thus more clearly defined, the other being that said portions provide clearances before and behind the cutting faces and space said faces from the handles. In addition, upon the faces of the shorter handle 6, at 12, 13, 14, 18, 19 and 20 are placed the indicating marks such as "12", "14" etc., to identify the pitches of the threads which the cutting faces in line with said handle faces are alined. Of course, the pitches may be entirely different than those shown.

However, in order to render the cutting faces exceedingly effective to actually cut away irregularities from damaged teeth and do so very smoothly, the teeth, as particularly shown in Fig. 5 are undercut as at 9'. But said teeth have two other features aside from those already mentioned, for they are cut in arcuate rows presenting the bowed portions of the arcuate rows in the forward direction. This also gives the individual teeth convex forward faces, so that during the cutting operation, the shavings of metal cut at each forward stroke of the tool will be curled away from the cut surfaces, the opposite sides of each arcuate row balancing the other side and destroying any tendency to side draft of the tool or cutting toward only one side.

As already indicated, the teeth 9' are primarily arranged in straight longitudinal rows as at 22, and transversely in arcuate rows as indicated at 21 in Fig. 4. It is quite evident that each tooth also has a convex cutting face as at 23, this form being exceptionally effective to cut and renew threads.

Although the handles are shown hexagonal in form to correspond with the form of the intermediate cutting section of the tool, they could also be round, especially handle 8, but in any case, it is obvious that when both handles are held in the hands of the workman using the tool, perfect control and easy manipulation of the tool is always obtained, and so long as the proper cutting face is selected to match the thread to be restored, the thread will quickly refinish the same and render it again fit for use.

Manifestly, I may alter the form of the tool and make modifications thereof within the scope of my invention.

Having now fully described my invention in detail, I claim:

A solid one-piece thread restoring tool terminating at one end in a long integral handle and at the other end in a relatively short handle also integral therewith, and provided with an intermediate solid thread restoring portion having a plurality of working faces individually disposed upon the sides thereof, each of which working faces comprises a plurality of continuous and unbroken longitudinal rows of cutting teeth having convex and undercut forward cutting faces, which cutting teeth are integral and also transversely arranged in an unbroken and continuous series of forwardly arched rows, and which short handle is provided with a plurality of indicia to correspond with and identify different pitches of the cutting teeth upon the various sides of the intermediate thread restoring portion, the same thread restoring portion being spaced from the handles by reduced portions upon said tool.

GUSTAV A. BOETTCHER.